Nov. 30, 1965 TOHCHUNG WEI 3,220,048
DETACHABLE HANDLE FOR STACKED FOOD VESSELS
Filed Feb. 10, 1964 2 Sheets-Sheet 1

INVENTOR.
Tohchung Wei
BY Polachek & Saulsbury
ATTORNEYS.

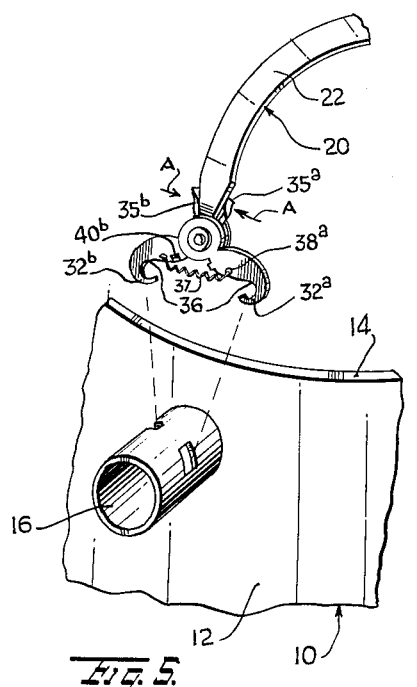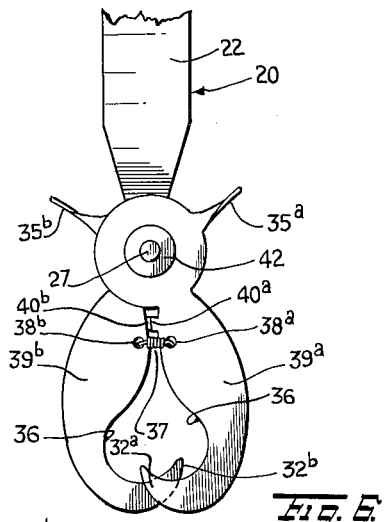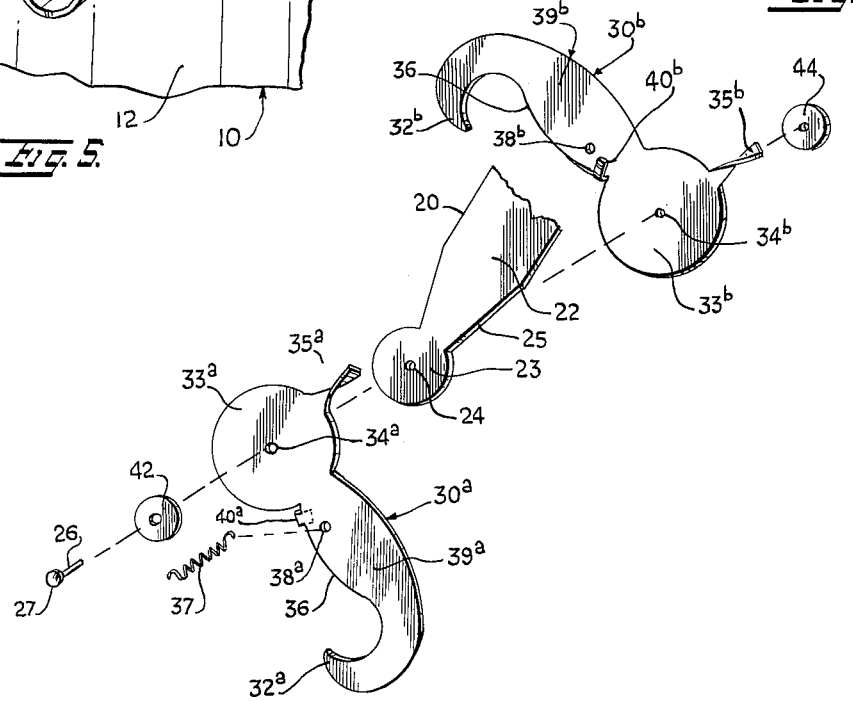

United States Patent Office 3,220,048
Patented Nov. 30, 1965

3,220,048
DETACHABLE HANDLE FOR STACKED
FOOD VESSELS
Tohchung Wei, 169 E. Broadway, New York, N.Y.
Filed Feb. 10, 1964, Ser. No. 343,665
12 Claims. (Cl. 16—114)

This invention concerns an improved detachable, interchangeable handle for cylindrical vessels used for cooking and transporting foods.

The need has long existed for a quick detachable handle which can be used cylindrical vessels. Previously proposed detachable handles have not been adjustable for various sizes of vessels. They have not supported the vessels in balanced position, and have had other difficulties or disadvantages such as complexity of construction, mechanical failure of threaded parts, etc.

It is an object of the present invention to provide an improved adjustable, interchangeable, quickly attachable and detachable handle for cylindrical vessels.

Another object is to provide a handle with a U-shaped strap or bail for supporting a vessel in upright, balanced position, the handle having pivotable hooks at opposite ends for engaging in apertured nipples on the vessel.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 5 is a perspective view of parts of the vessel and handle in detached position.

FIG. 6 is a view similar to a part of FIG. 3, showing the handle removed from the vessel.

FIG. 7 is an exploded perspective view of parts of the handle.

Figure 1:
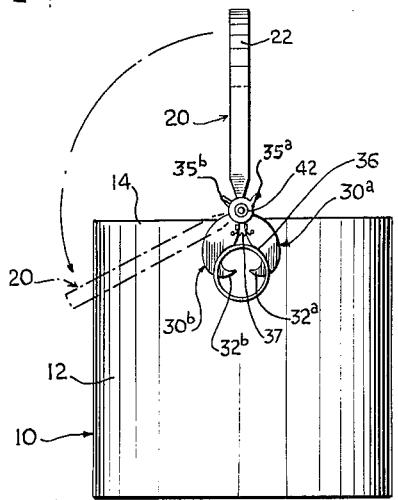
FIG. 1 is a side elevational view of a cylindrical vessel, container or pail provided with a handle according to the invention.
Figure 2:
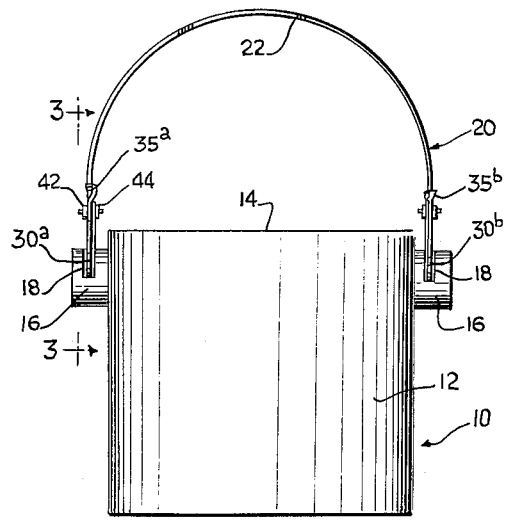
FIG. 2 is another side elevational view of the vessel and handle, taken 90° from the position of FIG. 1 on line 2–2 of FIG. 1.
Figures 3, 4:
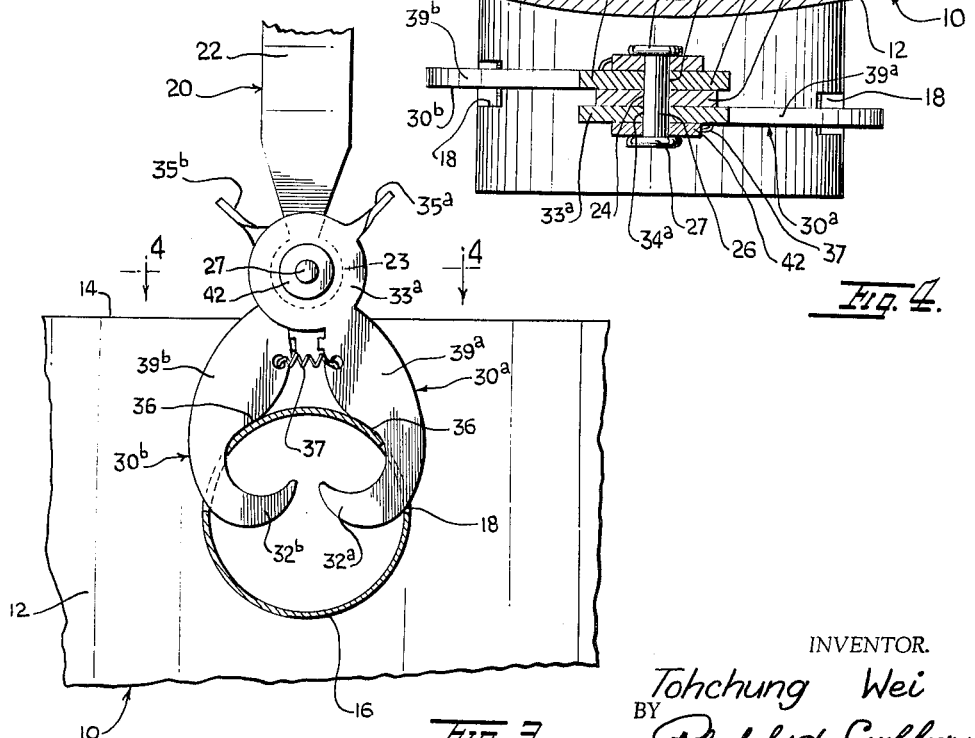
FIG. 3 is an enlarged sectional view taken on line 3–3 of FIG. 2.
FIG. 4 is a further enlarged sectional view taken on line 4–4 of FIG. 3.

Referring to FIGS. 1–7, there is shown a vessel 10 having a cylindrical wall 12. Near the upper edge 14 of the wall 12 at diametrically opposite positions on its outer side are two tubular nipples 16 disposed in axial alignment radially outward of the vessel. Two slots 18 are formed in each nipple. The slots are circumferentially spaced apart on opposite sides of the nipple.

The handle 20 includes a U-shaped strap or bail 22 which may be rigid or slightly flexible. The strap 22 is formed with a circular disk 23 at each end. The disk has a central hole 24; see FIGS. 4 and 7. A notched, tapered portion 25 of the handle joins the disk 23 to the central strap 22 of the handle. A rivet or pintle 26 passes through hole 24. Rotatably mounted on the rivet or pintle are two hooks 30a, 30b at each end of the handle.

Each of the hooks is a flat member with a curved, pointed prong 32a or 32b at its free end. At the other end of each hook is a circular disk 33a or 33b with central aperture 34a, 34b through which passes rivet 26. A finger piece or element 35a or 35b extends radially outwardly of each of the disks 33a, 33b. These finger pieces normally assume angularly spaced positions with respect to each other due to tension in a coil spring 37 having opposite ends engaged in holes 38a, 38b on the shanks 39a, 39b of the hooks; see FIGS 3 and 6. Lugs or tabs 40a, 40b may be provided on inner edges of the shanks and extending axially to engage each other to limit inward rotation of the hooks toward each other when detached from the nipples of the vessel, as the spring 37 contracts, as shown in FIG. 6. It will be noted that the hooks all have identical structure which effects economies in manufacture.

FIG. 5 shows the prongs 32a, 32b separated to maximum extent by finger pressure directed inwardly as indicated by arrows A on the finger pieces 35a, 35b. In this position the prongs of the hooks can be engaged in the respective slots 18 of a nipple 16. FIGS. 1–4 show the hooks engaged on each nipple at opposite ends of the vessel. The strap 22 of the handle extends arcuately over the top of the vessel. The contracted springs 37 hold the hooks securely in engagement with nipples, but the hooks can be readily disengaged by pressing the finger pieces toward each other to retract the prongs from the slots. Inner curved edges 36 of the shanks 39a, 39b conform in curvature to the nipples to seat the hooks securely on the nipples.

Washers 42, 44 are provided on opposite sides of the hooks 30a, 30b on each of the rivets 26 to facilitate rotation of the hooks. The heads 27 of the rivets abut the washers at opposite sides thereof.

Since the handle may be somewhat flexible, it will be adaptable for engagement on vessels of different diameters, both smaller and larger than vessel 10. The handle can be quickly removed or mounted by grasping the opposite ends of the handle in both hands and pressing the finger pieces inwardly toward each other manually to separate the end prongs. When the finger pieces are released, the hooks assume the retracted position of FIG. 6 with the prongs overlapping so that accidental contact cannot be made with the sharp points of the prongs.

The invention makes it possible to place a vessel in an oven or stove and then quickly to remove the handle. Thereafter, the handle can be quickly attached for removing the vessel from the stove. Alternatively, the handle can be used for carrying the vessel from one place to another and then can be removed from the vessel for mounting another vessel on top for stacking a plurality of vessels in an axially aligned vertical array. The handle is pivotally mounted on the rivets or pintles so that it can be swung to the out-of-the-way dotted line position shown in FIG. 1.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A handle assembly for a vessel having a cylindrical wall, comprising a pair of nipples secured to diametrically opposite positions on said wall and extending outwardly thereof in axial alignment, each of said nipples having a pair of slots spaced circumferentially apart on opposite sides of the nipple, and a handle detachably engaged on said nipples, said handle comprising a generally U-shaped strap having apertured opposite ends, rivets extending axially through said apertured ends of the strap so that the strap is rotatable on the rivets, a pair of flat hooks each having one end pivotally engaged on one of the rivets at each end of the strap, each of said hooks having a flat shank with curved inner edge conforming in curvature to the exterior of a nipple on said wall, said shank terminating in a curved pointed prong at the other end of the hook, said prong being engaged in one of the slots, whereby the prongs are retractable from the slots at each of the nipples for disengaging the handle from the nipples.

2. A handle assembly for a vessel having a cylindrical wall, comprising a pair of nipples secured to diametrically opposite positions on said wall and extending outwardly thereof in axial alignment, each of said nipples having a pair of slots spaced circumferentially apart on opposite sides of the nipple, a handle detachably engaged on said nipples, said handle comprising a generally U-shaped strap having apertured opposite ends, rivets extending axially through said apertured ends of the strap so that the strap is rotatable on the rivets, a pair of flat hooks each having one end pivotally engaged on one of the rivets at each end of the strap, each of said hooks having a flat shank with curved inner edge conforming in curvature to the exterior of a nipple on said wall, said shank terminating in a curved pointed prong at the other end of the hook, said prong being engaged in one of the slots, and a spring connecting the shanks at each end of the strap for holding the prongs retractably in the slots of the nipples, and for pulling the prongs into overlapping position when off the nipples.

3. A handle assembly for a vessel having a cylindrical wall, comprising a pair of nipples secured to diametrically opposite positions on said wall and extending outwardly thereof in axial alignment, each of said nipples having a pair of slots spaced circumferentially apart on opposite sides of the nipple, a handle detachably engaged on said nipples, said handle comprising a generally U-shaped strap having apertured opposite ends, rivets extending axially through said apertured ends of the strap so that the strap is rotatable on the rivets, a pair of flat hooks each having one end pivotally engaged on one of the rivets at each end of the strap, each of said hooks having a flat shank with curved inner edge conforming in curvature to the exterior of a nipple on said wall, said shank terminating in a curved pointed prong at the other end of the hook, said prong being engaged in one of the slots, a spring connecting the shanks at each end of the strap for holding the prongs retractably in the slots of the nipples and for pulling the prongs into overlapping position when off the nipples, and a finger piece extending radially outward of the one end of each hook, whereby the prongs are retractable from the slots at each of the nipples for disengaging the handle therefrom by manually pressing the finger pieces toward each other at each pair of hooks.

4. A handle for a vessel having a cylindrical wall with a pair of nipples secured to diametrically opposite positions on said wall and extending outwardly thereof in axial alignment, each of said nipples having a pair of slots spaced circumferentially apart on opposite sides of each nipple, said handle comprising a generally U-shaped strap having apertured opposite ends, rivets extending axially through said apertured ends of the strap so that the strap is rotatable on the rivets, a pair of flat hooks each having one end pivotally engaged on one of the rivets at each end of the strap, each of said hooks having a flat shank with curved inner edge conforming in curvature to the exterior of a nipple on said wall, said shank terminating in a curved pointed prong at the other end of the hook for engagement in one of the slots in a nipple.

5. A handle for a vessel having a cylindrical wall with a pair of nipples secured to diametrically opposite positions on said wall and extending outwardly thereof in axial alignment, each of said nipples having a pair of slots spaced circumferentially apart on opposite sides of each nipple, said handle comprising a generally U-shaped strap having apertured opposite ends, rivets extending axially through said apertured ends of the strap so that the strap is rotatable on the rivets, a pair of flat hooks each having one end pivotally engaged on one of the rivets at each end of the strap, each of said hooks having a flat shank with curved inner edge conforming in curvature to the exterior of a nipple on said wall, said shank terminating in a curved pointed prong at the other end of the hook for engagement in one of the slots in a nipple, and a spring connecting the shanks at each end of the strap for holding the prongs retractably in the slots of the nipples and for pulling the prongs into overlapping position when off the nipples.

6. A handle for a vessel having a cylindrical wall with a pair of nipples secured to diametrically opposite positions on said wall and extending outwardly thereof in axial alignment, each of said nipples having a pair of slots spaced circumferentially apart on opposite sides of each nipple, said handle comprising a generally U-shaped strap having apertured opposite ends, rivets extending axially through said apertured ends of the strap so that the strap is rotatable on the rivets, a pair of flat hooks each having one end pivotally engaged on one of the rivets at each end of the strap, each of said hooks having a flat shank with curved inner edge conforming in curvature to the exterior of a nipple on said wall, said shank terminating in a curved pointed prong at the other end of the hook for engagement in one of the slots in a nipple, a spring connecting the shank at each end of the strap for holding the prongs retractably in the slots of the nipples and for pulling the prongs into overlapping position when off the nipples, and a finger piece extending radially outward of the one end of each hook, whereby the prongs are retractable from the slots at each of the nipples for disengaging the handle therefrom by manually pressing the finger pieces toward each other at each pair of hooks.

7. A handle assembly for a vessel having a cylindrical wall, comprising a pair of nipples secured to diametrically opposite positions on said wall and extending outwardly thereof in axial alignment, each of said nipples having a pair of slots spaced circumferentially apart on opposite sides of the nipple, a handle detachably engaged on said nipples, said handle comprising a generally U-shaped strap having apertured opposite ends, rivets extending axially through said apertured ends of the strap so that the strap is rotatable on the rivets, a pair of flat hooks each having one end pivotally engaged on one of the rivets at each end of the strap, each of said hooks having a flat shank with curved inner edge conforming in curvature to the exterior of a nipple on said wall, said shank terminating in a curved pointed prong at the other end of the hook, said prong being engaged in one of the slots, and a spring connecting the shanks at each end of the strap for holding the prongs retractably in the slots of the nipples, and for pulling the prongs into overlapping position when off the nipples, each of said hooks having a tab on its shank extending outwardly of the inner edge thereof for engaging a similar tab on the shank of the adjacent hook to limit overlapping movements of the prongs when the hooks are off the nipples.

8. A handle assembly for a vessel having a cylindrical wall, comprising a pair of nipples secured to diametrically opposite positions on said wall and extending outwardly thereof in axial alignment, each of said nipples having a pair of slots spaced circumferentially apart on opposite sides of the nipple, a handle detachably engaged on said nipples, said handle comprising a generally U-shaped strap having apertured opposite ends, rivets extending axially through said apertured ends of the strap so that the strap is rotatable on the rivets, a pair of flat hooks each having one end pivotally engaged on one of the rivets at each end of the strap, each of said hooks having a flat shank with curved inner edge conforming in curvature to the exterior of a nipple on said wall, said shank terminating in a curved pointed prong at the other end of the hook, said prong being engaged in one of the slots, a spring connecting the shanks at each end of the strap for holding the prongs retractably in the slots of the nipples and for pulling the prongs into overlapping position when off the nipples, and a finger piece extending radially outward of the one end of each hook, whereby the prongs are retactable from the slots at each of the nipples for disengaging the handle therefrom by manually pressing the finger pieces toward each other at each pair of hooks, each of said hooks having a tab on its shank extending outwardly of the inner edge thereof for engaging a similar tab on the shank of the adjacent hook to limit overlapping movements of the prongs when the hooks are off the nipples.

9. A handle for a vessel having a cylindrical wall with a pair of nipples secured to diametrically opposite positions on said wall and extending outwardly thereof in axial alignment, each of said nipples having a pair of slots spaced circumferentially apart on opposite sides of each nipple, said handle comprising a generally U-shaped strap having apertured opposite ends, rivets extending axially through said apertured ends of the strap so that the strap is rotatable on the rivets, a pair of flat hooks each having one end pivotally engaged on one of the rivets at each end of the strap, each of said hooks having a flat shank with curved inner edge conforming in curvature to the exterior of a nipple on said wall, said shank terminating in a curved pointed prong at the other end of the hook for engagement in one of the slots in a nipple, and a spring connecting the shanks at each end of the strap for holding the prongs retractably in the slots of the nipples and for pulling the prongs into overlapping position when off the nipples, each of said hooks having a tab on its shank extending outwardly of the inner edge thereof for engaging a similar tab on the shank of the adjacent hook to limit overlapping movements of the prongs when the hooks are off the nipples.

10. A handle for a vessel havink a cylindrical wall with a pair of nipples secured to diametrically opposite positions on said wall and extending outwardly thereof in axial alignment, each of said nipples having a pair of slots spaced circumferentially apart on opposite sides of each nipple, said handle comprising a generally U-shaped strap having apertured opposite ends, rivets extending axially through said apertured ends of the strap so that the strap is rotatable on the rivets, a pair of flat hooks each having one end pivotally engaged on one of the rivets at each end of the strap, each of said hooks having a flat shank with curved inner edge conforming in curvature to the exterior of a nipple on said wall, said shank terminating in a curved pointed prong at the other end of the hook for engagement in one of the slots in a nipple, a spring connecting the shank at each end of the strap for holding the prongs retractably in the slots of the nipples and for pulling the prongs into overlapping position when off the nipples, and a finger piece extending radially outward of the one end of each hook, whereby the prongs are retractable from the slots at each of the nipples for disengaging the handle therefrom by manually pressing the finger pieces toward each other at each pair of hooks, each of said hooks having a tab on its shank extending outwardly of the inner edge thereof for engaging a similar tab on the shank of the adjacent hook to limit overlapping movements of the prongs when the hooks are off the nipples.

11. A handle for a vessel having a cylindrical wall with a pair of nipples secured to diametrically opposite positions on said wall and extending outwardly thereof in axial alignment, each of said nipples having a pair of slots spaced circumferentially apart on opposite sides of each nipple, said handle comprising a generally U-shaped strap having apertured opposite ends, rivets extending axially through said apertured ends of the strap so that the strap is rotatable on the rivets, a pair of flat hooks each having one end pivotally engaged on one of the rivets at each end of the strap, each of the said hooks having a flat shank with curved inner edge conforming in curvature to the exterior of a nipple on said wall, said shank terminating in a curved pointed prong at the other end of the hook for engagement in one of the slots in a nipple, a spring connecting the shank at each end of the strap for holding the prongs retractably in the slots of the nipples and for pulling the prongs into overlapping position when off the nipples, and a finger piece extending radially outward of the one end of each hook, whereby the prongs are retractable from the slots at each of the nipples for disengaging the handle therefrom by manually pressing the finger piece toward each other at each pair of hooks, each of said hooks having a tab on its shank extending outwardly of the inner edge thereof for engaging a similar tab on the shank of the adjacent hook to limit overlapping movements of the prongs when the hooks are off the nipples, and washers on the rivets to facilitate turning the hooks on the rivets.

12. A handle assembly for a vessel having a cylindrical wall, comprising a pair of nipples secured to diametrically opposite positions on said wall and extending outwardly thereof in axial alignment, each of said nipples having a pair of slots spaced circumferentially apart on opposite sides of the nipple, a handle detachably engaged on said nipples, said handle comprising a generally U-shaped strap having apertured opposite ends, rivets extending axially through said apertured ends of the strap so that the strap is rotatable on the rivets, a pair of flat hooks each having one end pivotally engaged on one of the rivets at each end of the strap, each of said hooks having a flat shank with curved inner edge conforming in curvature to the exterior of a nipple on said wall, said shank terminating in a curved pointed prong at the other end of the hook, said prong being engaged in one of the slots, a spring connecting the shanks at each end of the strap for holding the prongs retractably in the slots of the nipples and for pulling the prongs into overlapping position when off the nipples, a finger piece extending radially outward of the one end of each hook, whereby the prongs are retractable from the slots at each of the nipples for disengaging the handle therefrom by manually pressing the finger pieces toward each other at each pair of hooks, and washers on the rivets to facilitate turning the hooks on the rivets.

References Cited by the Examiner

UNITED STATES PATENTS

| 874,681 | 12/1907 | Hungate | 16—114 |
| 3,170,593 | 2/1965 | Ulman et al. | 220—91 |

JOSEPH D. SEERS, *Primary Examiner.*